United States Patent [19]

Saur

[11] 4,361,225

[45] Nov. 30, 1982

[54] ACTUATOR BELT ACCUMULATOR

[75] Inventor: Charles W. Saur, Sparta, Mich.

[73] Assignee: Lear Siegler, Inc., Grand Rapids, Mich.

[21] Appl. No.: 188,314

[22] Filed: Sep. 18, 1980

[51] Int. Cl.³ .............................................. B65G 13/06
[52] U.S. Cl. .................................... 198/781; 198/790
[58] Field of Search ............................... 198/781, 790

[56] References Cited

U.S. PATENT DOCUMENTS 4,269,305  5/1981  Fryatt .................................. 198/781

Primary Examiner—Andres Kashnikow
Assistant Examiner—Brian Bond
Attorney, Agent, or Firm—Price, Heneveld, Huizenga & Cooper

[57] ABSTRACT

An accumulator has a driven belt which is so supported that it either propels the articles by contact with them or by driving rollers on which the articles are supported. In either case, rotatable supports are provided beneath the belt. Several of these supports constitute a group over which a secondary or satellite belt is trained. The secondary belt contacts the lower face of the driven belt, supporting and spacing it above the rotatable supports. Each support has at least two portions of different diameters with a ramp between. Control means shifts the secondary belt between the portions and in so doing moves the driven belt vertically between a raised article drive position and a lowered article release position.

2 Claims, 12 Drawing Figures

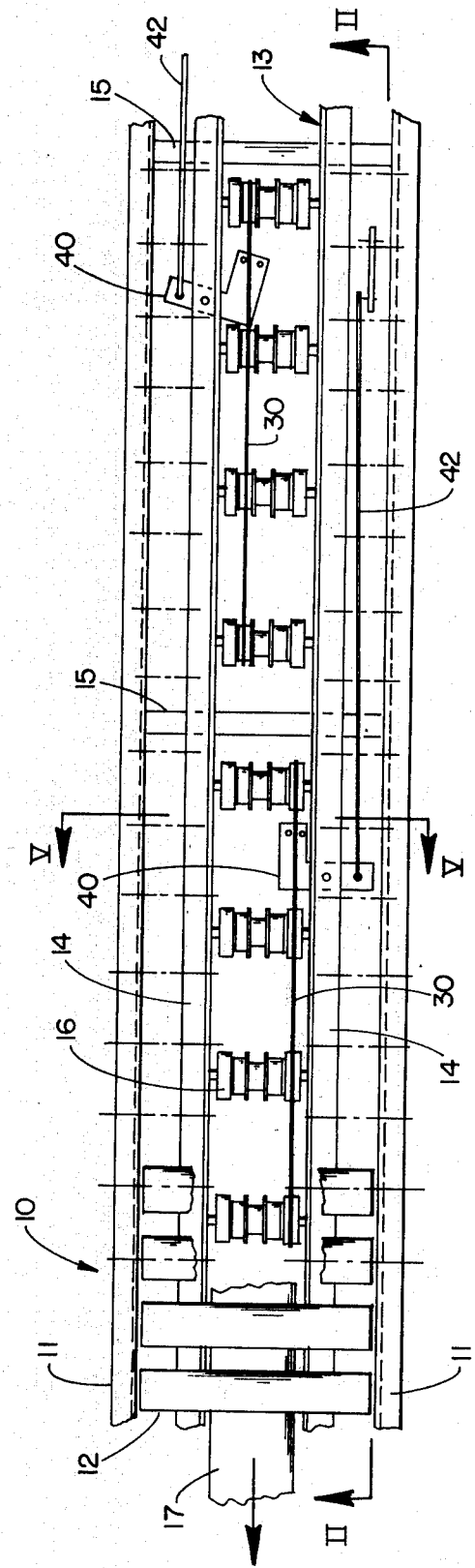
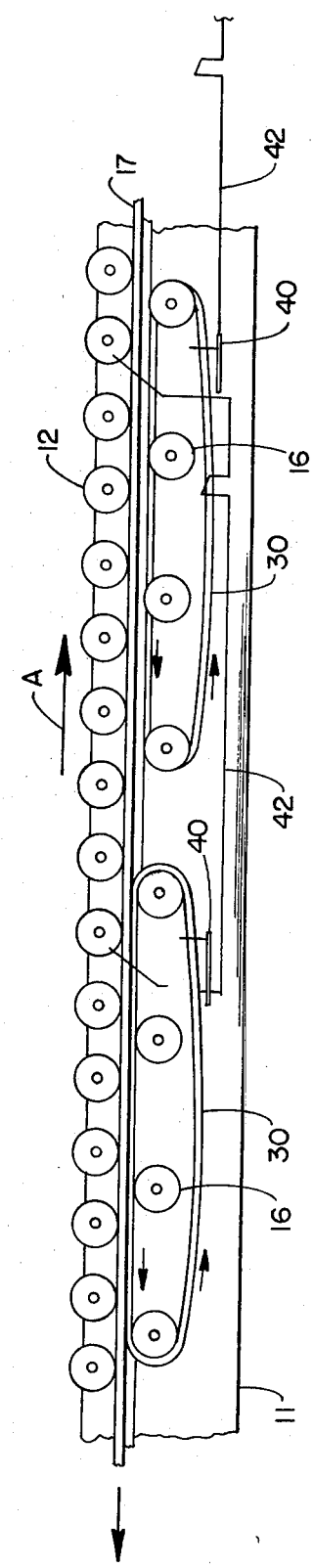
FIG. 1
FIG. 2

4,361,225

ACTUATOR BELT ACCUMULATOR

FIELD OF THE INVENTION

This invention relates to accumulator conveyors equipped with a driven propelling member vertically shiftable between transport and accumulation modes. The invention is applicable to both roller and wheel conveyor and thus has application whether the articles are propelled by physical contact with the propelling member or indirectly because they are resting on rollers driven by the propelling member. The invention pertains to the construction of the means for shifting the belt's position.

BACKGROUND OF THE INVENTION

Since accumulators of this type were first introduced, numerous constructions have been developed for shifting the position of the propelling member between accumulation and transport modes. While many of these have been very effective, they have all had one or more shortcomings which have heretofore not been overcome. One of these has been the noise incident to the frequent movement of the propelling member supporting devices, particularly when the equipment is used at higher speeds. Another problem has been that of providing a means which will shift the driven belt or propelling member without requiring either the application of a substantial force by the article contacting sensor or an intervening auxiliary power source such as a solenoid or a pneumatic actuator. Without the auxiliary power source only a limited range of article weights were capable of triggering the mechanism. The use of the auxiliary or secondary power source materially increased both complexity and cost. Since the introduction of the original accumulators, the demand for increased throughput and speed has materially increased the problem of noise and the necessity for developing drive belt or propelling member control systems which have a dampened reaction, that is, do not respond immediately each time a sensor is actuated by an article passing over it. This is particularly important in reducing the effective operating noise level of this type of accumulator as well as decreasing wear and increasing article throughput.

BRIEF DESCRIPTION OF THE INVENTION

The accumulator of this invention has a propelling member supported by rollers mounted on vertically fixed axles. The rollers have at least two axially spaced portions, one of which is of a greater diameter than the other. Between these portions is a ramp section. Passing over each of the rollers is a secondary or satellite belt. The satellite belt, rather than the roller, contacts the bottom surface of the propelling member and supports the propelling member in a raised position spaced above the surface of the roller. Means are provided to shift the satellite belt between the portions of the support roller whereby in one position it is passing over the portion of larger diameter and in the other position it is passing over the portion of lesser diameter. As a result of this shift of the satellite belt between the support roller portions, the propelling member is raised or lowered, thus controlling whether it is in propelling mode or in accumulation mode. The position of each satellite belt is controlled by an article sensor which responds to the presence of articles on the conveyor surface.

BRIEF DESCRIPTION OF THE DRAWINGS

FIG. 1 is a fragmentary, plan view of a powered roller conveyor and accumulator incorporating this invention with portions of the propelling member and article conveying rollers broken out for purposes of clarity;

FIG. 2 is a schematic sectional, elevation view taken along the plane II—II of FIG. 1 with the support roller mounting rail omitted for purposes of clarity;

DESCRIPTION OF THE PREFERRED EMBODIMENT

Figure 3:
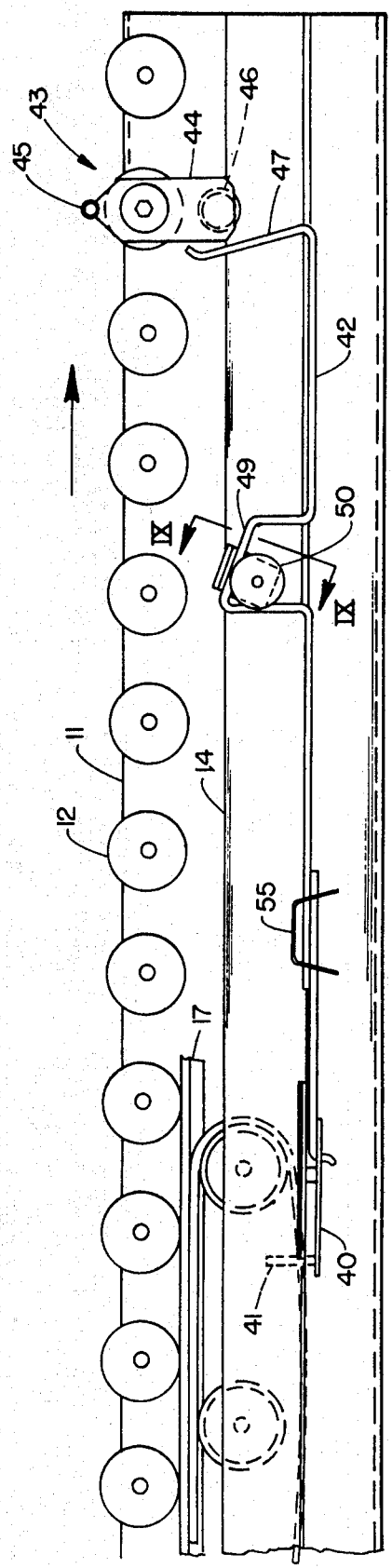
FIG. 3 is an enlarged, fragmentary, elevation view of a portion of the conveyor illustrating one actuator mechanism for controlling belt position with the conveyor in transport mode.

Referring to FIG. 1, the numeral 10 identifies a conveyor having a pair of spaced side rails 11 between which are rotatably mounted a plurality of conveyor rollers 12 forming a conveying surface. Extending along the center of the conveyor and beneath the rollers 12 is a frame 13 having a pair of angles 14 spaced apart forming a central lane. The angles are supported at spaced intervals by suitable means such as the cross pieces 15 which extend between and join the frame members 11. Rotatably mounted to and between the angles 14 are a plurality of supports 16 which, in turn, support the driven propelling member 17. The support members 16 are mounted on fixed shafts whereby their vertical position is stationary. The propelling member 17 is driven by any suitable means (not illustrated) for the purpose of propelling articles along the conveyor. The structure, as it has been described to this point, is conventional and has long been used in the conveyor art.

Figure 5:
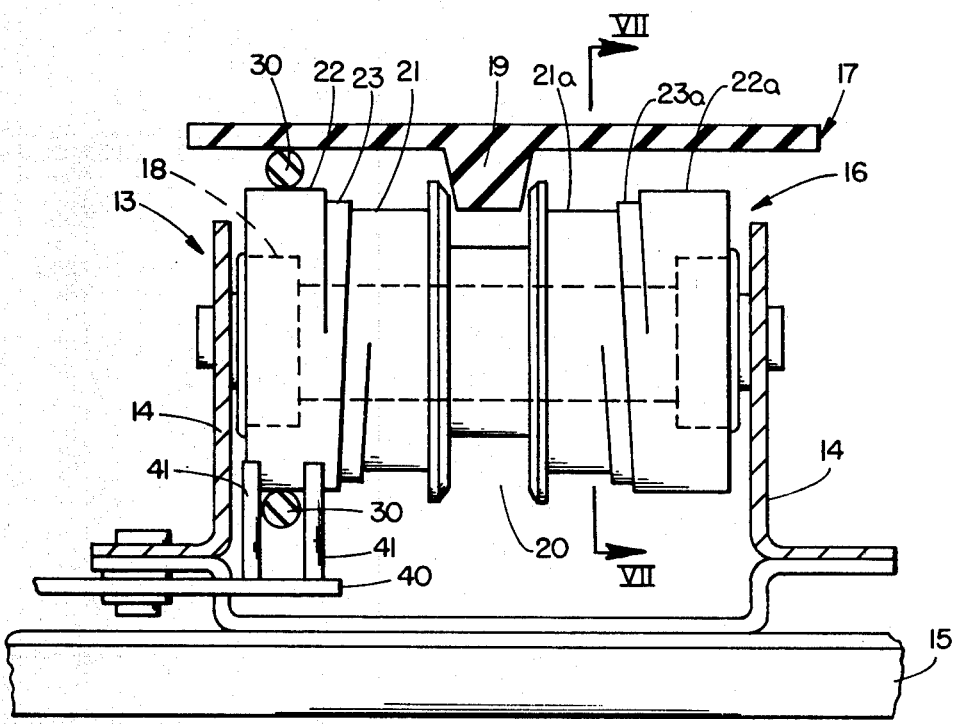
FIG. 5 is an enlarged, sectional view of the driven belt taken along the plane V—V of FIG. 1 and one of its supports in conveying mode.
Figure 6:
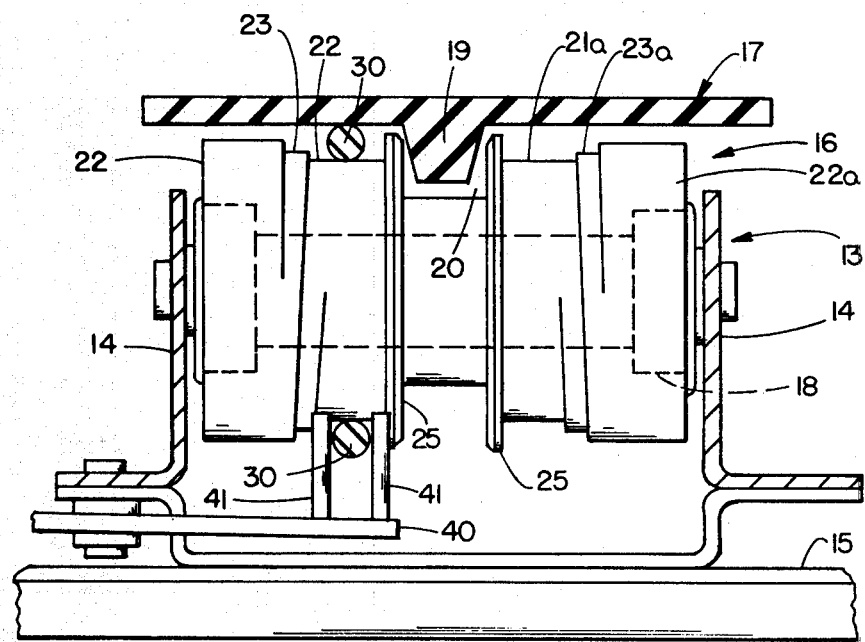
FIG. 6 is a view similar to FIG. 5 illustrating the conveyor in accumulation mode.
Figure 7:
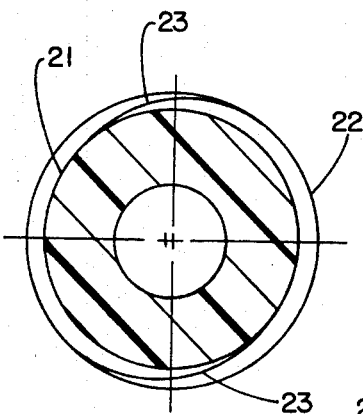
FIG. 7 is a sectional view taken along the plane VII—VII of FIG. 5.
Figure 10:
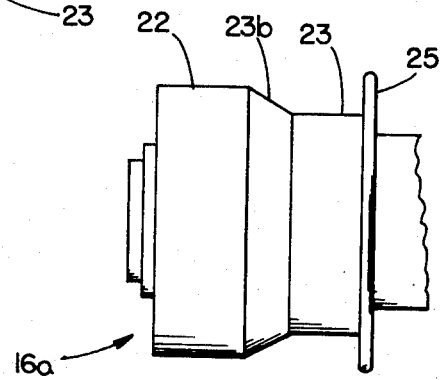
FIG. 10 is a fragmentary, side elevation view of a modified construction for the support roller.

The support members 16 are rollers freely rotatable on bearings 18 (FIGS. 5 and 6). Each support roller has a central channel 20 for receiving the guide rib 19 of the propelling member belt 17. On opposite sides of the channel 20, the roller has inner portions 21 and 21a. On opposite sides of the channel, the roller also has outer portions 22 and 22a. The inner portions are of lesser diameter than the outer portions. Between the portions 21 and 22 and 21a and 22a, are ramp portions 23 and 23a. As illustrated, the ramp portions are spiral shoulders extending approximately 150° to 180° around the roller and provide transition portions between the inner portions and the outer portions (FIGS. 5, 6 and 7). FIG.

10 illustrates the fact that the ramp portion 23b need not be a spiral since a frustoconical portion can provide an incline between the inner and outer portions. The central channel is separated from each of the inner portions by a pair of spaced circumferential flanges 25. These serve as guides for the belt rib 19 irrespective of its vertical position.

A secondary or satellite belt 30 is provided which is seated on the support rollers 16 between the support roller and the propelling member 17. The satellite belt 30 supports the propelling member 17 in vertically spaced position above the support roller 16. When the satellite belt 30 is riding on the larger diameter, outer portion 22, the propelling member 17 is lifted to its raised position and when the satellite belt 30 is shifted to the inner portion 21, the propelling member 17 shifts to its lowered position. It is important that the thickness of the satellite belt 30 be such that even when it is trained around the smaller, inner portions 21 and 21a of the support rollers it has positive contact with the propeller member or driven belt 17. This is necessitated by the fact that it must be driven by the propelling member at all times to assure its continued movement when it has to cross the ramp portions 23, particularly when shifting to the raised position. Because of the difference in total loop length, the satellite belts cannot be tightly engaged around the inner portions 21 or 21a unless the belts are of an elastic type material. Therefore, they need to be driven by the propelling member belt rather than relying upon being indirectly driven by the support rollers. The satellite belts should be of a material having good frictional engagement with the propelling member 17.

As illustrated is FIGS. 1 and 2, each of the satellite belts 30 is an endless loop or band passing around several of the supports 16. In the particular arrangement illustrated in FIGS. 1 and 2, each satellite belt engages four of the support rollers 16 connecting them together as an operating group. It will also be observed from FIG. 1 that in a preferred arrangement the next adjacent satellite belt along the conveyor is mounted on the opposite end of the supports 16 of its group. This alternate positioning of the satellite belts is utilized along the length of the conveyor to provide support for the propelling member on both sides of its centerline.

Figure 8:
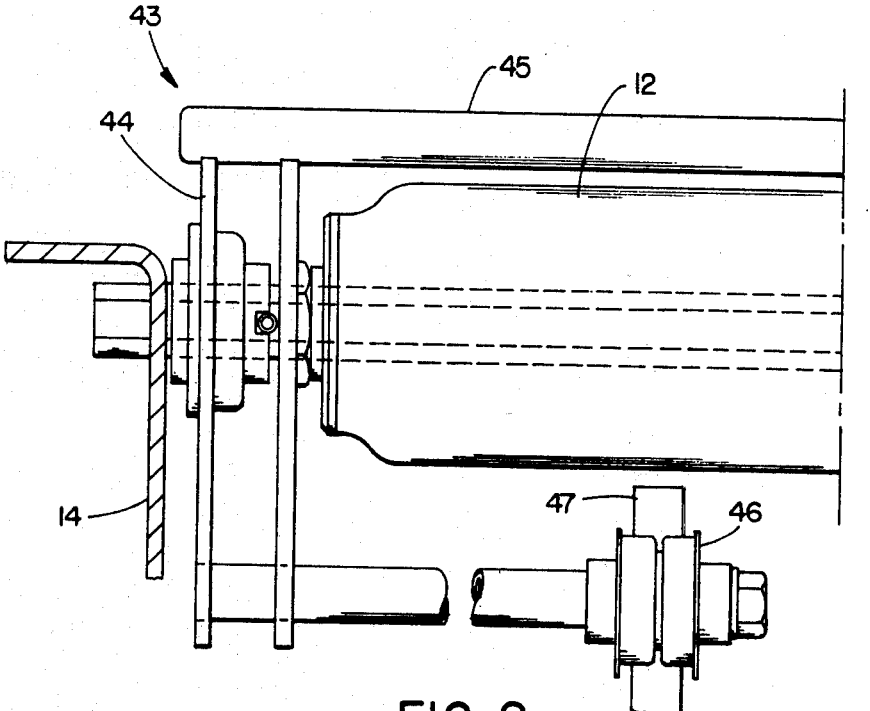
FIG. 8 is a fragmentary, sectional view of one end of a sensor for the conveyor.

The lateral position of each satellite belt 30 is controlled by an actuator bracket 40 pivotally mounted beneath the frame 13 (FIGS. 1, 3 and 5). Each of the actuator brackets 40 has a pair of upstanding pins 41 spaced apart sufficiently to receive the satellite belt 30 between them. Each of the actuator brackets 40, at its opposite end, is connected by a suitable linkage 42 to a sensor 43 mounted downstream with respect to the direction of article movement of the group of rollers and the satellite belt which it controls. The sensor 43 has a pair of arms 44 connected by an actuator bar 45 (FIG. 8). The arms between their ends are pivotally supported on the shaft of one of the conveyor rollers 12. Preferably, an arm is provided at each end of the roller 12 whereby the actuator bar 45 extends the full width of the conveyor. At its lower end, one of the arms has a rod mounting a suitable bearing 46 which engages the upstanding end 47 of the linkage 42.

Figure 4:
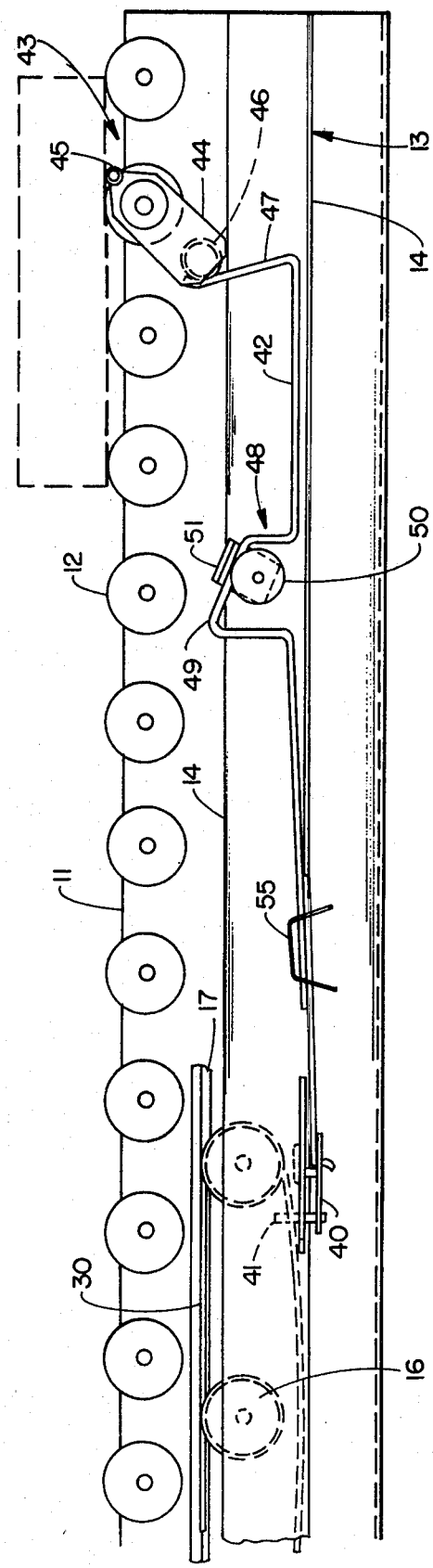
FIG. 4 is a view similar to FIG. 3 illustrating the conveyor in accumulation mode.
Figure 9:
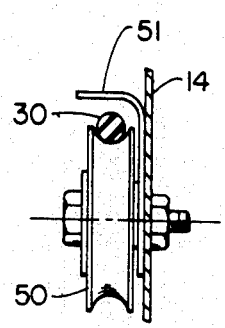
FIG. 9 is a sectional view taken along the plane IX—IX of FIG. 3.

Intermediate its ends, the linkage 42 has an upwardly extending loop 48, the top portion 49 of which is steeply inclined downwardly toward the sensor 43 (FIGS. 3, 4 and 9). The top portion 49 rides in the channel of a pulley-like wheel 50 and is prevented from inadvertent displacement from the channel by a bracket 51. When an article depresses the sensor bar 45, the linkage 42 is forced to climb up the support 50 as illustrated in FIG. 4. The steepness of the inclined top portion 49 biases the linkage to slide downstream when the sensor is released and free to rock back to its original position. When the linkage shifts to the actuated position illustrated in FIG. 4, the bracket 40 is pivoted in a manner to force the satellite belt 30 inwardly to the position illustrated in FIG. 6. As the belt is moved inwardly, it shifts from one portion of the support roller 16 to another by means of the ramp 23. When the sensor is released, the bracket 40 returns to its normal position, causing the satellite belt 30 to ride up the ramp 23 and, once again, ride on the outer portion 22 of greater diameter. In so doing, the propelling member 17 is raised to its active or conveying position.

The bracket 40 only has to provide enough force to induce the satellite belt 30 to shift lengthwise of the support rollers 16. This requires only light pushing motion against the side of the satellite belt. The force necessary to cause the belt to cross the ramp 23, whether moving inwardly or outwardly, is supplied by the propelling member 17 since the satellite belt at all times contacts and is driven by the propelling member. This is an important feature because it materially reduces the resistance of the sensor 43 to actuation by an article. The amount of force necessary to actuate the sensor is also reduced by the fact that the inclined ramp formed by the top portion 49 of the loop 48 eliminates the necessity for a spring for returning the linkage 42 to its original position. Thus, the invention permits the accumulator to operate successfully with articles having a wide range of weights and sizes without hangup of any of the articles because of insufficient weight to pivot the sensor bar.

Another functional feature of importance is the fact that the satellite belt has a delayed response to activation of the sensor. It is a progressive reaction. Thus, an article in normal movement passing over a sensor although triggering the mechanism, does not actually shift the satellite belt to accumulation mode because the sensor will have been released before accumulation mode is effected.

The linkage 42 can be fabricated in two parts joined by bracket 55 (FIGS. 3 and 4). The bracket provides a means of adjusting the length of the linkage to precisely match the spacing between the sensor 43 and bracket 40 to obtain accurate and positive operation.

The number of supports 16 included in a single group and thus the length of each of the satellite belts 30 is determined by the average size of the articles with which the conveyor is expecting it to be used. Thus, if the articles are short, the number of support rollers in each group will be small. On the other hand, the greater the average length of the articles in each group, the greater the number of support rollers in each group. Thus, the illustration of four support rollers forming a group is illustrative only and does not represent a limitation upon the scope of this invention.

Figure 11:
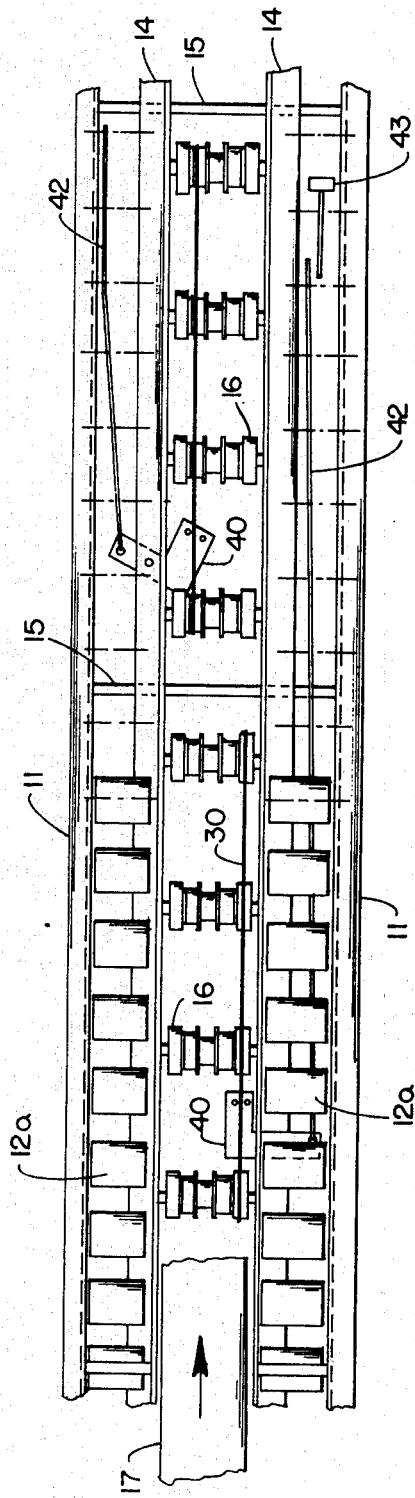
FIG. 11 is a view similar to FIG. 1, illustrating the invention applied to a wheel type conveyor.
Figure 12:
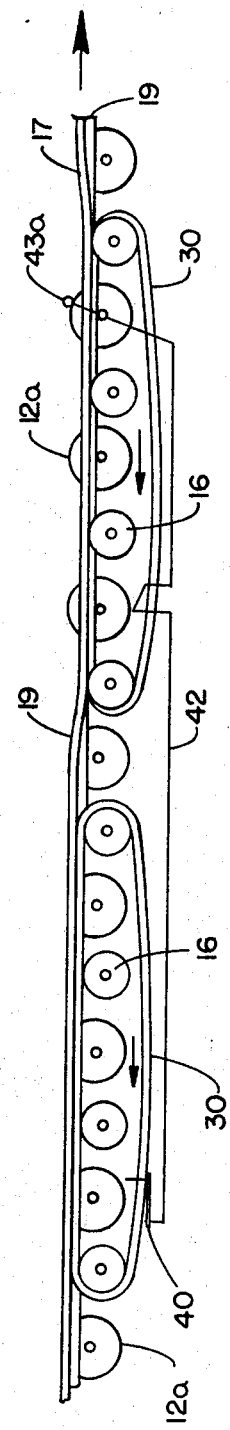
FIG. 12 is a view similar to FIG. 2, illustrating the invention applied to a wheel type conveyor.

FIGS. 11 and 12 illustrate the fact that this invention can be applied to a wheel-type conveyor, that is, one in which direct contact is made between the propelling member and the articles on the conveyor. In this case, the propelling member in its raised position is at the conveyor surface and is flanked on each side by wheels or short rollers 12a. The satellite belts 30 and their support rollers 16 are identical. The arrangement of the sensors and the actuator brackets, however, has to be modified. The change is necessitated by the fact that the movement of the articles corresponds to that of the propelling member rather than opposite to it. Thus the sensors 43a are downstream of the movement of the propelling member rather than upstream as is the case where the propelling member is beneath the article supporting rollers.

It will be observed that the invention provides a conveyor structure which can operate either as a conveyor or as an accumulator and is capable of operating at higher speeds with reduced noise. While the satellite belts have been illustrated as of circular cross section, it will be recognized that this is not essential inasmuch as belts of rectangular or square cross section could be used, particularly if the inclined ramp structure 23b is utilized. It will also be recognized that it is entirely possible to employ a pair of the satellite belts for each group with the satellite belts located on each side of the centerline of the propelling member. Such an arrangement will provide a more balanced support for the propelling member. In this case, either a pair of the actuator brackets 40 or a modified bracket will be necessary to shift the belts of each pair simultaneously.

Having described the preferred embodiment of the invention and modifications thereof, it will be recognized by those skilled in the art that other modifications can be made without departing from the principle of the invention. Such modifications are to be considered as included in the hereinafter appended claims unless these claims by their language expressly state otherwise.

The embodiments of the invention in which an exclusive property or privilege is claimed are defined as follows.

1. In an accumulator having rotatable means forming an article supporting and transporting surface, a driven belt for propelling articles along said conveyor and means for supporting said belt in a raised article propelling position and in a lowered article released position, said means characterized in having a plurality of rollers beneath said belt; said rollers lengthwise being symmetrical about their midpoint; said rollers being arranged in groups, each group including a plurality of rollers; a plurality of endless secondary belts, each secondary belt being entrained over a plurality of said rollers; each of said rollers having a pair of portions of maximum diameter and a pair of portions of reduced diameter, said portions of maximum diameter being spaced apart, one adjacent each end of the roller, each of said portions of reduced diameter being adjacent one of said portions of maximum diameter, a belt guiding central channel between said reduced diameter portions; a spiral ramp between each of said reduced diameter portions and its adjacent maximum diameter portion; a plurality of tracking members, one tracking member engaging each of said secondary belts, each of said tracking members being moveable axially of said rollers between one pair of said maximum and reduced diameter portions and across the ramp therebetween; each tracking member having a pair of guides, one on each side of one of said secondary belts for moving said secondary belt between said maximum diameter portion wherein said driven belt is supported in raised position and said reduced diameter portion wherein said secondary belt is lowered lowering said driven belt to its article release position; a plurality of article actuated sensor means, one attached to each of said tracking members.

2. An accumulator as described in claim 1 further characterized in that a plurality of said secondary belts are provided arranged in tandem along said conveyor each secondary belt being on the opposite side of the centerline of said driven belt from each adjacent secondary belt.

* * * * *